US012707325B2

(12) United States Patent
Erta et al.

(10) Patent No.: US 12,707,325 B2
(45) Date of Patent: Aug. 11, 2026

(54) WIRELESS TRANSMISSION RATE SELECTION WITH STATELESS AND OFFLINE DICTIONARY COMPRESSION

(71) Applicant: Cisco Technology, Inc., San Jose, CA (US)

(72) Inventors: Alessandro Erta, Licciana Nardi (IT); Carmine Benedetto, Pisa (IT); Rupak Chandra, Fremont, CA (US); Luca Bisti, Grosseto (IT)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 17/749,869

(22) Filed: May 20, 2022

(65) Prior Publication Data

US 2023/0379758 A1 Nov. 23, 2023

(51) Int. Cl.
*H04W 28/06* (2009.01)
*H04W 28/02* (2009.01)

(52) U.S. Cl.
CPC ....... *H04W 28/06* (2013.01); *H04W 28/0236* (2013.01); *H04W 28/0268* (2013.01)

(58) Field of Classification Search
CPC ......... H04W 28/0236; H04W 28/0268; H04W 28/06
See application file for complete search history.

(56) References Cited

U.S. PATENT DOCUMENTS 7,031,259 B1 * 4/2006 Guttman .............. H04N 21/218 348/E7.071
7,420,992 B1 9/2008 Fang et al.
8,610,606 B2 12/2013 Glass et al.
9,301,196 B2 3/2016 Asterjadhi et al.
9,398,489 B1 7/2016 Akhter et al.
10,484,113 B1 * 11/2019 Benedetto ............ H04B 17/318
2003/0030575 A1 * 2/2003 Frachtenberg ...... H03M 7/3088 341/51
2010/0103953 A1 * 4/2010 Matias ................ H04L 65/1101 370/477

(Continued)

FOREIGN PATENT DOCUMENTS

CN 107318108 A * 11/2017 ............ H04W 76/10

OTHER PUBLICATIONS

Sun, et al., "Application of Machine Learning in Wireless Networks: Key Techniques and Open Issues", IEEE Communications Surveys & Tutorials ( vol. 21, Issue: 4, Fourth Quarter 2019), Jun. 2019, pp. 3072-3108, IEEE.

(Continued)

*Primary Examiner* — Moo Jeong
*Assistant Examiner* — David Zhijun Sun
(74) *Attorney, Agent, or Firm* — Lee & Hayes, P.C.

(57) ABSTRACT

In one embodiment, a device in a wireless network selects a transmission rate for one or more packets to be sent, based on a received signal strength indicator value. The device makes a determination that the one or more packets should be compressed, based on the transmission rate selected by the device. The device applies, based on the determination, stateless offline dictionary compression to the one or more packets, to form a compressed stream of one or more packets. The device sends the compressed stream via the wireless network and using the transmission rate selected by the device.

20 Claims, 10 Drawing Sheets

RSSI BINS

INSTANCES OF TRANSMISSION PARAMETERS

| | 1 | ... | M |
|---|---|---|---|
| 1 | CUMULATIVE AIRTIME 802a | | |
| ... | | | |
| N | | | |

(56) References Cited

U.S. PATENT DOCUMENTS

| | | | | |
|---|---|---|---|---|
| 2015/0117196 | A1* | 4/2015 | Wang | H04W 28/0289 370/232 |
| 2017/0214773 | A1 | 7/2017 | Fan et al. | |
| 2018/0248591 | A1* | 8/2018 | Geng | H04B 7/0413 |
| 2019/0104077 | A1* | 4/2019 | Burgess | H04L 69/04 |
| 2021/0144584 | A1 | 5/2021 | Chandra et al. | |
| 2022/0172731 | A1* | 6/2022 | Liang | G10L 25/06 |
| 2023/0066251 | A1* | 3/2023 | Trim | H04L 47/28 |

OTHER PUBLICATIONS

Camp, et al., "Modulation Rate Adaptation in Urban and Vehicular Environments: Cross-layer Implementation and Experimental Evaluation", MobiCom'08, Sep. 14-19, 2008, 12 pages, ACM, San Francisco, California.

Matias et al., "Delayed-Dictionary Compression for Packet Networks", Proceedings IEEE 24th Annual Joint Conference of the IEEE Computer and Communications Societies, Mar. 13-17, 2005, 12 pages, IEEE, Miami, FL.

"Difference between stateless and stateful compression?", online: https://stackoverflow.com/questions/3994244/difference-between-stateless-and-stateful-compression, accessed: May 4, 2022, 2 pages.

Larsson, et al., "Offline Dictionary-Based Compression", Proceedings DCC'99 Data Compression Conference (Cat. No. PR00096), Mar. 1999, IEEE, Snowbird, UT.

* cited by examiner

WIRELESS TRANSMISSION RATE SELECTION WITH STATELESS AND OFFLINE DICTIONARY COMPRESSION

TECHNICAL FIELD

The present disclosure relates generally to computer networks, and, more particularly, wireless transmission rate selection with stateless and offline dictionary compression.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. However, cellular technologies are typically not practical for certain scenarios involving fast moving nodes, such as trains. Thus, backhauling in these types of deployments typically rely on using Wi-Fi between mobile nodes and access points (APs) distributed along the path of travel.

Rate adaptation can help to improve the overall performance in a wireless network by changing the transmission rate of wireless communications, depending on the current network conditions. For instance, in the case of poor conditions, the transmission rate may be adjusted downward, to help ensure delivery. However, this is not without a cost: reducing the transmission rate also increases the amount of airtime needed to transmit the same number of bytes. Consequently, the channel bandwidth is also reduced, which can impact system operations, particularly in mission-critical and automated systems.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
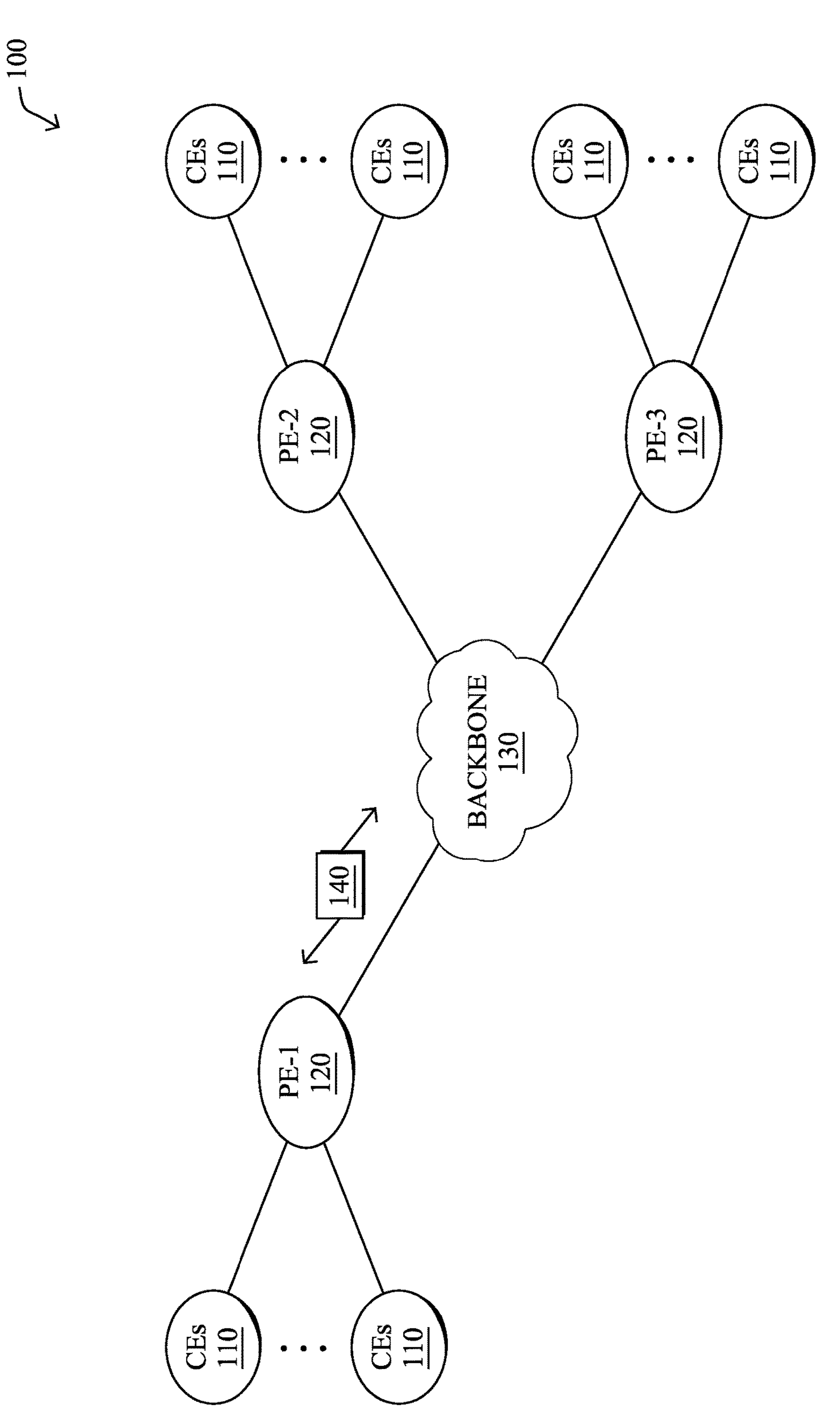
FIGS. 1A-1B illustrate an example communication network.

According to one or more embodiments of the disclosure, a device in a wireless network selects a transmission rate for one or more packets to be sent, based on a received signal strength indicator value. The device makes a determination that the one or more packets should be compressed, based on the transmission rate selected by the device. The device applies, based on the determination, stateless offline dictionary compression to the one or more packets, to form a compressed stream of one or more packets. The device sends the compressed stream via the wireless network and using the transmission rate selected by the device.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
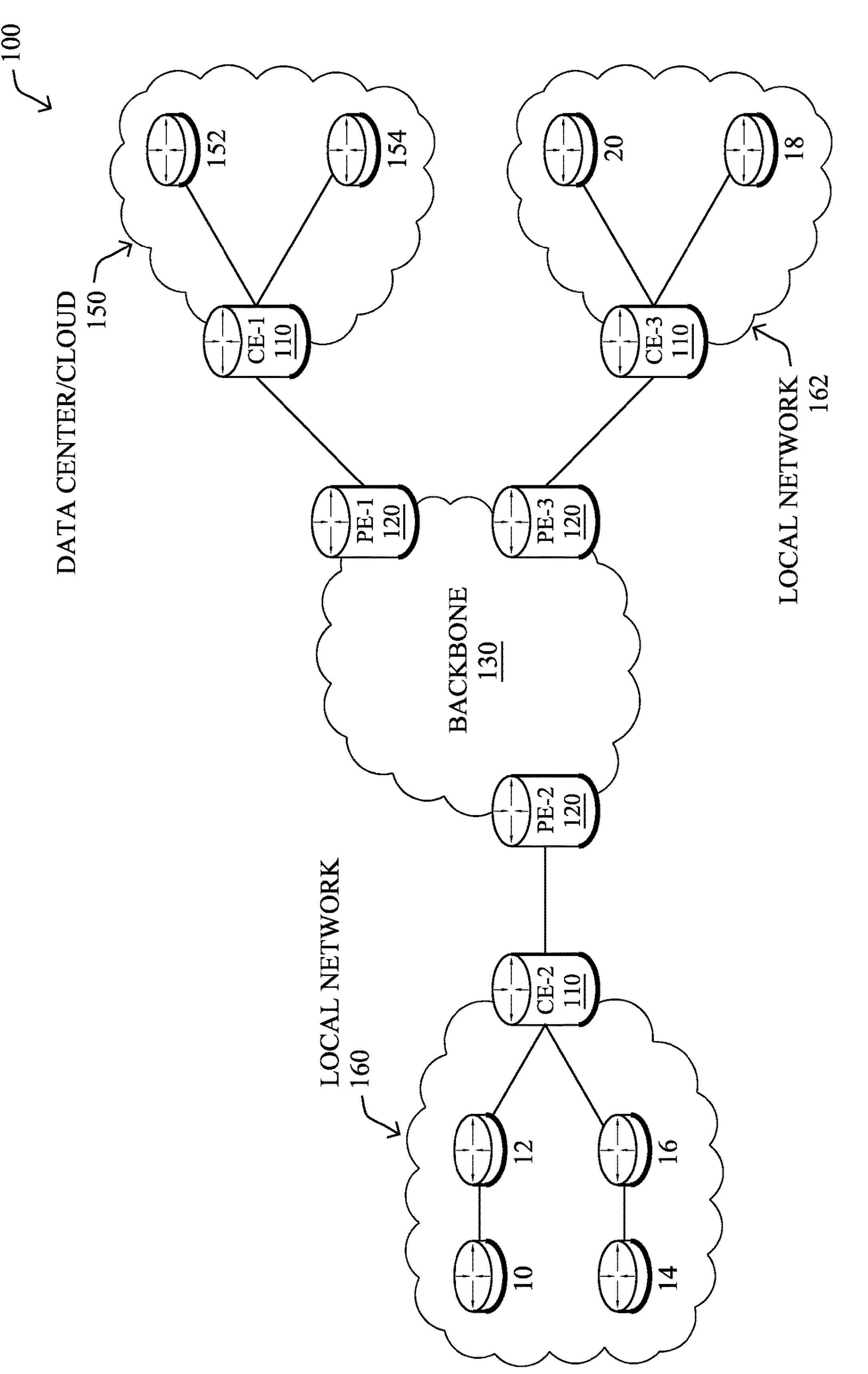

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
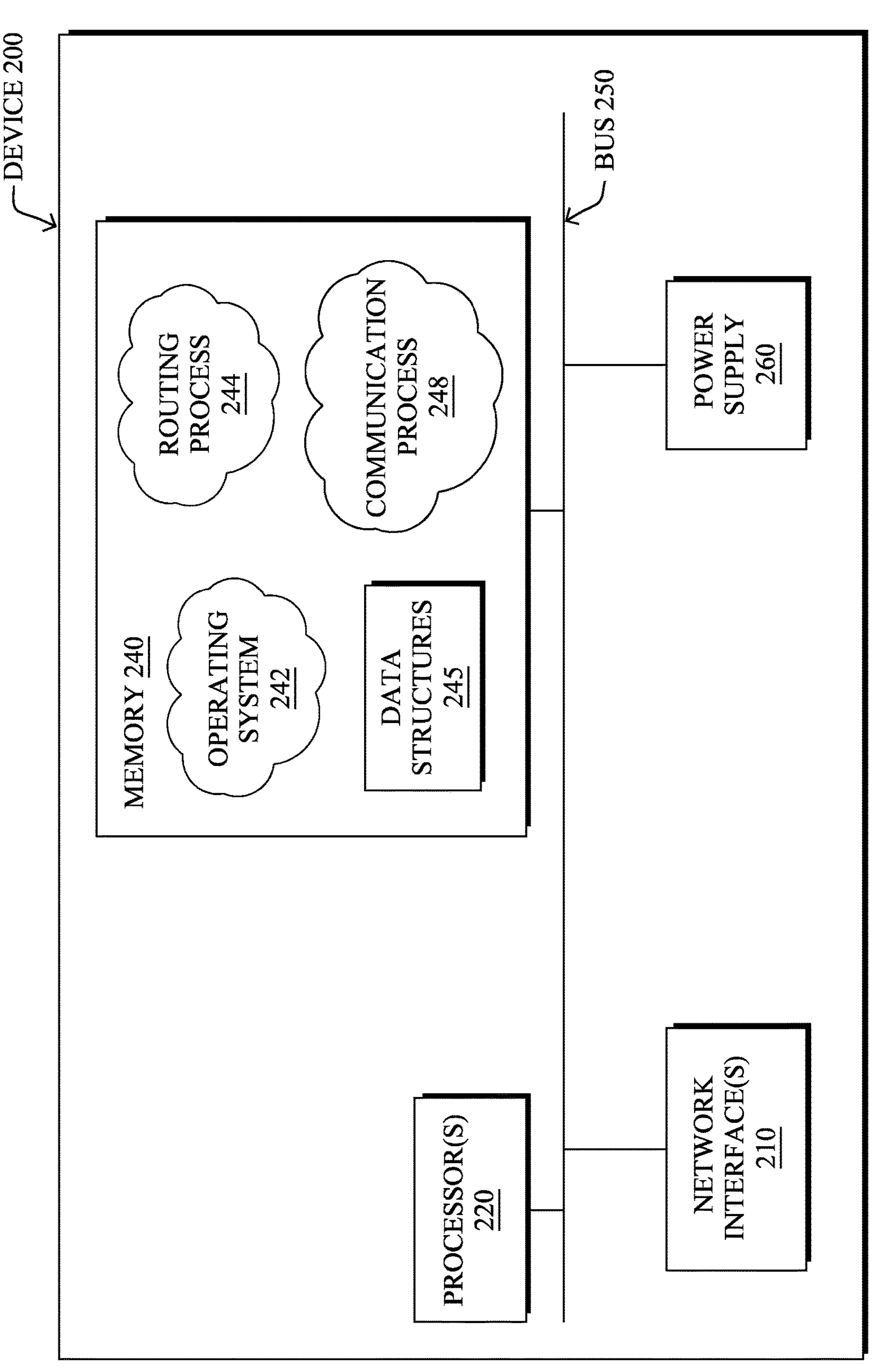
FIG. 2 illustrates an example network device/node.

FIG. 2 is a schematic block diagram of an example node/device 200 (i.e., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein (e.g., to select a wireless transmission rate). To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample wireless metrics labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
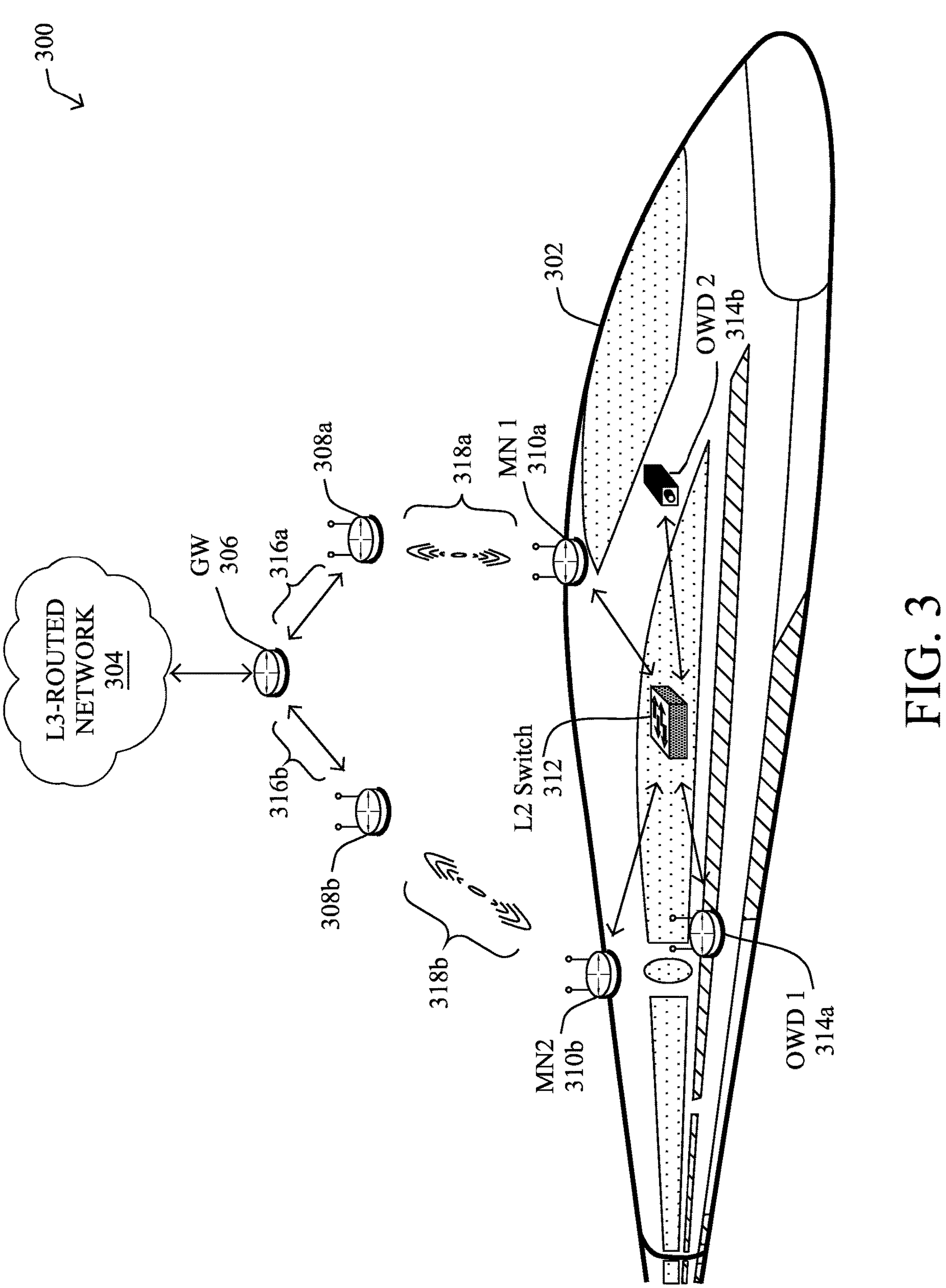
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314*a* may take the form of an onboard Wi-Fi access point that provides connectivity to any number of user devices (e.g., mobile phones, computers, etc.) of passengers being transported by mobile system 302. Conversely, onboard device 314*b* may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310*a* and a second MN 310*b*. Each MN 310 may generally include: 1.) a wireless interface to exchange data with wireless access points of the backhaul network and 2.) a local interface to exchange data with the local network of mobile system 302. For instance, MN 310*a* and MN 310*b* may each have a wired connection to L2 switch 312.

As would be appreciated, MN 310*a* and MN 310*b* may be located on mobile system 302 at a distance from one another, so as to provide spatial diversity to the potential wireless connection points utilized by mobile system 302. For example, MN 310*a* may be located near the front of mobile system 302 (e.g., the head-end of a train), while MN 310*b* may be located farther towards the rear of mobile system 302 than that of MN 310*a*. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308*a*-308*b* shown. Note that while these wireless access points are referred to herein as 'trackside,' their locations can be varied depending on the deployment scenario (e.g., roadside, etc.).

During operation, base stations 308*a*-308*b* may form wireless connections with MN 310*a* and/or MN 310*b*, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308*a*-308*b* and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310*a* has formed a wireless connection 318*a* with base station 308*a*. Such a connection may be formed using a suitable transmission protocol, such as the Prodigy protocol by Fluidmesh (now Cisco Systems) or another wireless protocol that supports extremely fast handoffs. Consequently, MN 310*a* may establish a first tunnel over wireless connection 318*a*. GW 306 and base station 308*a* may form a second tunnel via their connection 316*a*, likewise. Thus, when base station 308*a* sends traffic that it receives from MN 310*a* towards GW 306, it may encapsulate the traffic and tunneled via the first tunnel, which base station 308*a* then encapsulates for transport via the second tunnel to GW 306. A similar approach may be taken with respect to wireless connection 318*b* between MN 310*b* and base station 308*b*, as well as connection 316*b* between base station 308*b* and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308*a* over which traffic conveyed between base station 308*a* and MN 310*a* may be transported, assuming that wireless connection 318*a* exists. Similarly, another GW 306 and base station 308*b* may form a second L2 tunnel over which traffic conveyed between base station 308*b* and MN 310*b* may be transported, assuming that wireless connection 318*a* exists.

Typically, only a single wireless link is active at any given time between a mobile system, such as mobile system 302, and any given base station 308. For instance, assume that MN 310*a* is wirelessly connected to base station 308*a*. In such a case, any other MN 310 on mobile system 302 (e.g., MN 310*b*, etc.) may be in an idle state at that time. In other words, one of the mobile nodes (e.g., MN 310*a*) may be designated as the primary, while the other is designated as the secondary (e.g., MN 310*b*) and remains idle. As mobile system 302 roams, the primary node may begin passing its traffic to the secondary node, to begin leveraging its own connection to the fixed infrastructure. In turn, the roles of the two nodes may be switched, thereby mating MN 310*a* the secondary node and MN 310*b* the primary node.

As would be appreciated, the environmental conditions in fast moving wireless scenarios, such as the one shown in FIG. 3, can lead to variations in signal quality, link performance, and the like. In various embodiments, one way to help alleviate some of these issues would be to adapt the transmission rate according to the current or expected conditions. Indeed, in cases of diminished conditions, employing a lower transmission rate can help to ensure successful receipt of a wireless communication.

Figure 4:
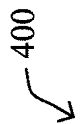
FIG. 4 illustrates an example of a mobile system performing sampling.
Figure 4:
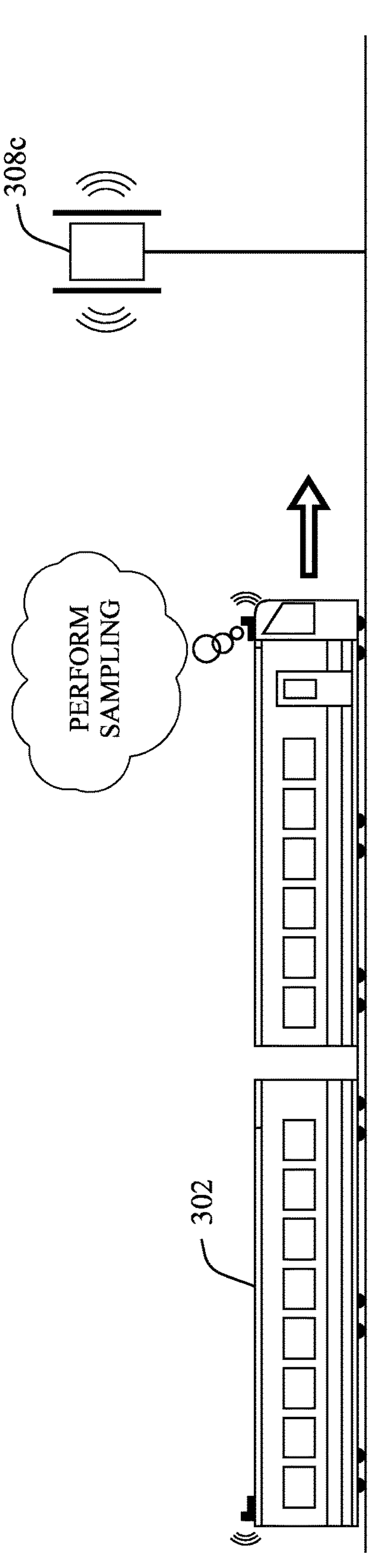

A potential prerequisite for implementing rate adaptation is to first conduct a sampling phase during which a mobile system obtains information about the network conditions at various locations. Accordingly, as shown in FIG. 4, mobile system 302 may enter into a sampling mode of operation during which it attempts to learn the relationship between the network conditions and different transmission rates.

More specifically, assume that mobile system 302 is within communication distance of access point 308*c*. In such a case, mobile system 302 may determine any or all of the following:

The signal strength of access point 308*c*, such as by determining the received signal strength indicator (RSSI) of any beacons or other communications sent by access point 308*c* and received by mobile system 302.

The quality of service (QoS) tag(s) of any packets to be sent by mobile system 302 to access point 308*c*. This can be done, for instance, by mobile system 302 performing a classification of those packets and assigning QoS tags to them, such as based on the application(s) or traffic types associated with those packets. For example, mobile system 302 may determine whether the packets are part of a real time traffic flow, part of a traffic flow for a video application, etc.

In various embodiments, during the sampling phase, mobile system 302 may select a transmission rate to test. To do so, mobile system 302 may set any number of transmission parameters that can affect the transmission rate of its wireless communications. For instance, mobile system 302 may adjust parameters that control any or all of the following: Modulation Coding Scheme (MCS) index, spatial streams, channel bandwidth, guard interval, or combinations thereof. In turn, mobile system 302 may assess how its wireless communications performed with access point 308*c*.

In some instances, mobile system 302 may select transmission rates during its sampling phase in a pseudo-random manner, so as to obtain a wide variety of samples. However, this approach can also be more resource and time intensive. In further embodiments, mobile system 302 may leverage machine learning, to reduce the rates to be tested to a limited subset according to a recognized pattern. For instance, mobile system 302 may leverage a machine learning model that predicts the RSSI or other signal strength of access point 308*c* as mobile system 302 approaches it (e.g., based on their relative locations, time of day, etc.), upcoming handoffs between different access points, or other events, so as to maximize the amount of learning that can be done during the sampling phase.

According to various embodiments, mobile system 302 may receive feedback from access point 308*c* regarding its wireless communications. Such feedback may indicate to mobile system 302 whether any of its predictions, such as a predicted RSSI, were indeed correct.

Figure 5:
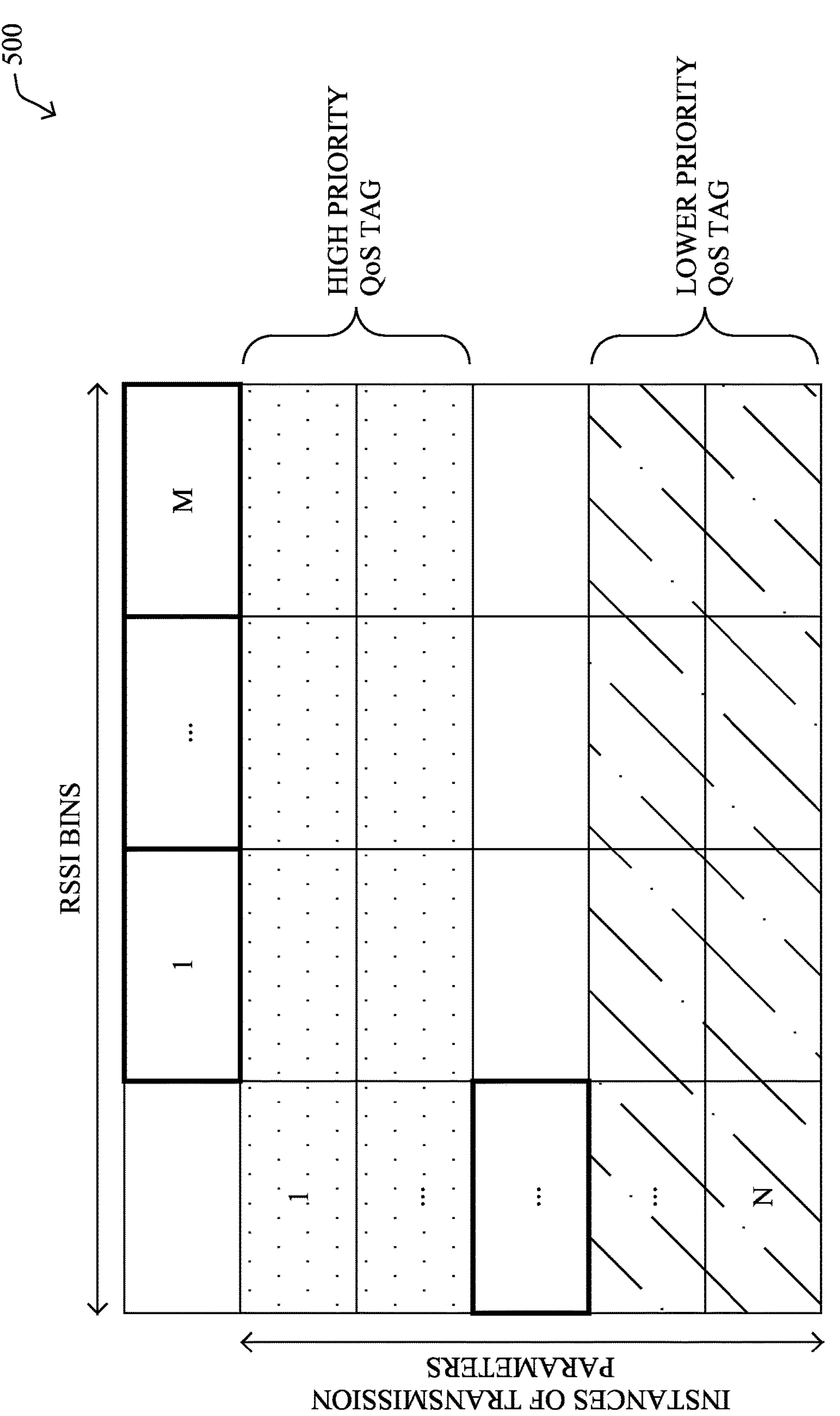
FIG. 5 illustrates an example rate lookup table.

FIG. 5 illustrates an example rate lookup table 500, according to various embodiments. As shown, rate lookup table 500 may be populated using the information obtained during the sampling mode of operation of the mobile node/system. More specifically, the mobile system may correlate the signal strength values, transmission rate parameters, and traffic QoS tags, allowing for a quick lookup of the optimal transmission parameters under different conditions.

In some embodiments, the mobile system may group the RSSI values into M-number of 'bins,' that represent different ranges of the RSSI values. This can be done, for instance, by equally dividing up the full range of expected RSSI values, by using a histogram or other statistical approach, or the like.

Similarly, rate lookup table 500 may also represent N-number sets of different transmission parameters, which may be sub-divided by the QoS tags of the traffic involved. As shown, a distinction is made in FIG. 5 between table entries in rate lookup table 500 that are associated with high-priority QoS tags and those that are associated with low-priority QoS tags. However, the QoS tags can be further sub-divided into different categories, as desired. Generally, the QoS tags may represent a range in rate lookup table 500 from highest priority to lowest priority traffic, with different sets of associated transmission parameters and RSSI values, accordingly.

Over the course of time, mobile system 302 may use its received feedback to populate each RSSI bin in rate lookup table 500 with the best instance of transmission rate parameters across the different QoS tags. This allows mobile system 302 to then perform a lookup of the optimal transmission rate parameters for any RSSI value that it predicts, while also taking into account the QoS requirements of the traffic to be sent. In other words, the idea here is that different types of traffic may have different requirements with respect to their data transmission rates. Thus, QoS tagging can also be taken into account when performing the rate selection. More specifically, higher priority traffic (e.g., real time traffic) typically requires increased reliability and lower and more robust rate values can be set, accordingly. Conversely, lower priority traffic (e.g., video traffic) may require more throughput, so higher and more performing rate values can be used.

A further aspect of the rate adaptation mechanism herein may be to leverage machine learning, to predict the optimal transmission rate parameters to be used at any given time. Accordingly, in some embodiments, mobile system 302 may train a supervised or semi-supervised machine learning model that takes as input the following:

R(t)—the RSSI observations over time

D(t)—the devices/access points to which the mobile system connects over time

Further input parameters may also take into account the physical location of mobile system 302, such as using GPS coordinates, range estimation parameters available in certain wireless standards (e.g., 802.11mc, WPS in Wi-Fi 6 and Wi-Fi 7, etc.), or the like.

Figure 6:
FIG. 6 illustrates an example of the use of the rate lookup table of FIG. 5 during a wireless handoff.
Figure 6:
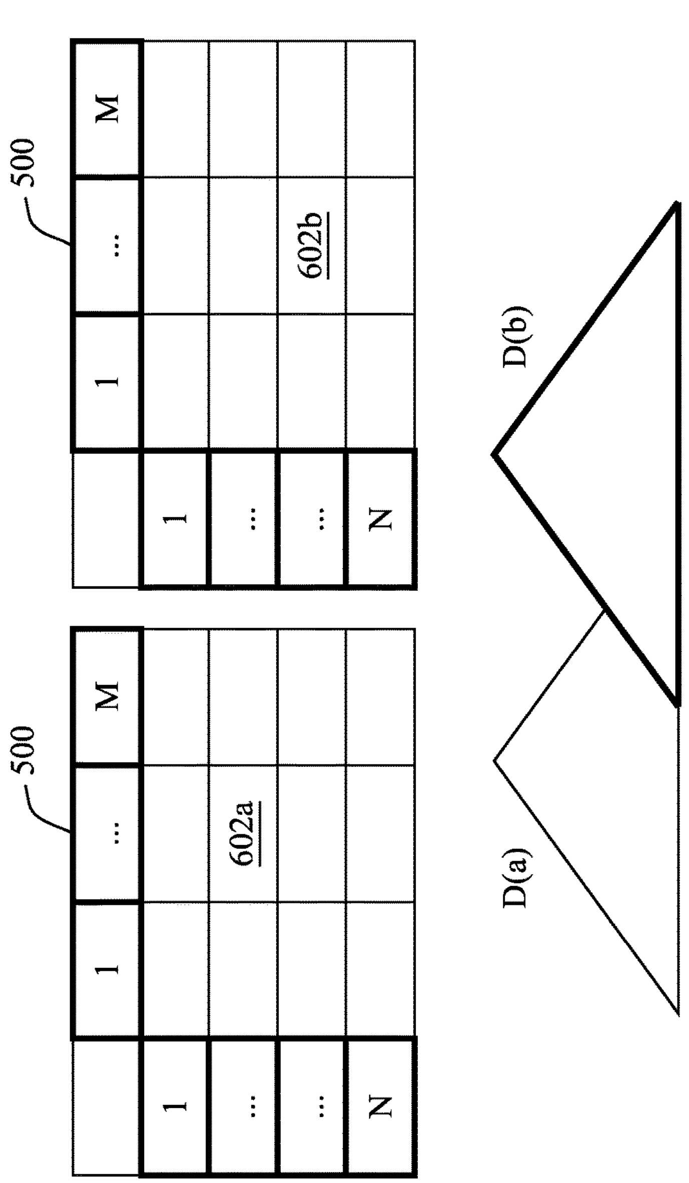

In turn, the machine learning model may output the following:

S—the subset of instances of transmission parameters to be used by the rate controller when approaching a handoff FIG. 6 illustrates an example 600 of the use of such a mechanism with respect to the rate lookup table of FIG. 5 during a wireless handoff, according to various embodiments. As shown, assume that the trained machine learning model determine that mobile system 302 is going to undergo a wireless handoff between a first access point, D(a), to a second access point, D(b). In such a case, the machine learning model may determine that entry 602*a* in rate lookup table 500 represents the optimal transmission parameters to use when communicating with D(a). However, during the handoff, an entirely different entry 602*b* represents the optimal transmission parameters to be used when mobile system 302 performs the handoff with D(b). Thus, mobile system 302 is able to adaptively adjust its transmission rate during a wireless handoff, to optimize its transmissions. Of course, the handoff optimization can also further take into account the specific QoS of the traffic to be transmitted, as well.

Figure 7:
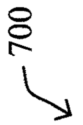
FIG. 7 illustrates an example of a mobile system selecting transmission rate parameters.
Figure 7:
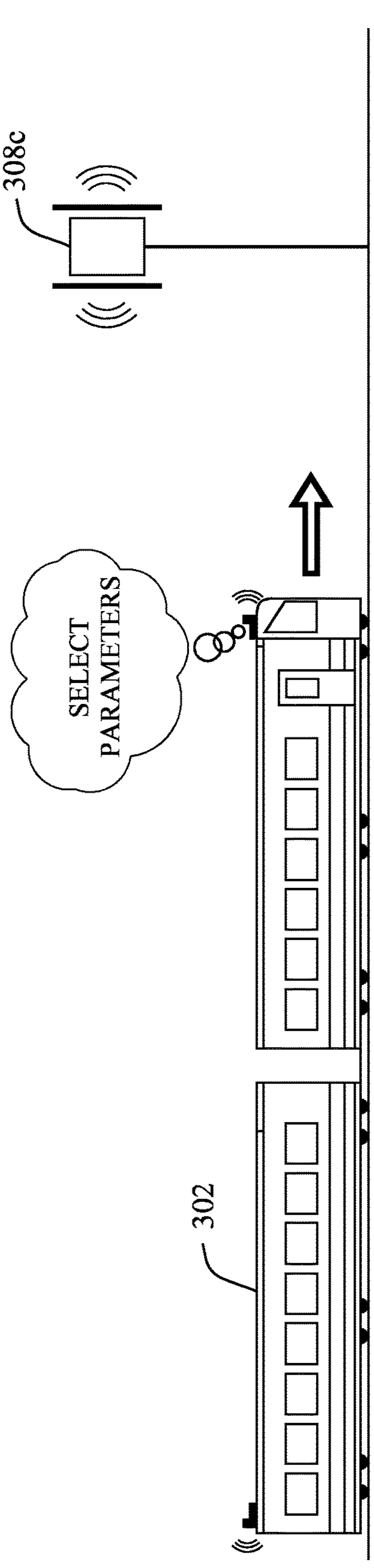

FIG. 7 illustrates an example of mobile system 302 selecting transmission rate parameters, according to various embodiments. Once mobile system 302 has undergone a sampling phase and populated its rate lookup table 500, it may then proceed as follows:

First, mobile system 302 may determine a signal strength for access point 308*c*, as well as the QoS tag(s) of any traffic that mobile system 302 is to send to access point 308*c*. Preferably, the signal strength is a predicted signal strength that mobile system 302 predicts based on its prior interactions with access point 308*c*. The QoS tags can also be identified by mobile system 302 by classifying the packets to be sent, such as according to the protocols that they use, their destinations, their associated applications, or the like.

Next, mobile system 302 may perform a lookup of transmission parameters to use from its rate lookup table 500, based on the above. In doing so, mobile system 302 will select the optimal transmission rate at which to send its packets to access point 308*c*.

Finally, mobile system 302 may send its queued packets to access point 308*c* using the selected transmission rate for those packets.

Note that the above steps are also adaptive in nature and may be repeated by mobile system 302 over the course of time. Thus, if the signal strength value associated with access point 308*c* changes significantly, of if the QoS tags of the traffic change, mobile system 302 may opt to use a different set of transmission parameters and a different transmission rate.

Unfortunately, adaptively reducing the wireless transmission rate is not without cost, as doing so also increases the amount of airtime needed to transmit the same number of bytes. Consequently, the channel bandwidth is also reduced, which can impact system operations, particularly in mission-critical and automated systems.

One naïve approach to addressing the increased airtime of a rate adaptation mechanism would be to simply apply compression to all of the wireless communications, in some embodiments. However, applying compression also has its own tradeoffs: the encoding and decoding operations for the compression mechanism also increases the end-to-end latency of the transmission. For critical traffic (e.g., control traffic), this added latency may not be acceptable, as it will degrade system performance.

——Wireless Transmission Rate Selection with Stateless and Offline Dictionary Compression——

The techniques introduced herein seek to optimize a rate adaptation mechanism used in a wireless network through the selective use of data compression. In some aspects, stateless and offline dictionary-based compression may be used to compress a transmission, when a lower transmission rate is selected for it.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a device in a wireless network selects a transmission rate for one or more packets to be sent, based on a received signal strength indicator value. The device makes a determination that the one or more packets should be compressed, based on the transmission rate selected by the device. The device applies, based on the determination, stateless offline dictionary compression to the one or more packets, to form a compressed stream of one or more packets. The device sends the compressed stream via the wireless network and using the transmission rate selected by the device.

Operationally, the techniques herein propose extending a rate adaptation mechanism by further compressing the application traffic when a lower transmission rate is selected, according to various embodiments. Thus, as shown in FIG. 7, the transmission parameter selection by mobile system 302 may also parameters that control if, and when, traffic is to be sent in compressed form.

Preferably, and in various embodiments, mobile system 302 may compress a stream of packets for sending by applying a stateless, offline dictionary-based compression scheme to the uncompressed packets. In general, stateless compression schemes differ from stateful schemes in that they do not rely on a prior history of the data. This is particularly useful as it allows for the instantaneous recovery from intermittent packet loss, without the need for packet retries, thereby keeping a low latency profile.

In addition, the techniques herein also propose that an offline dictionary be used for the compression of the traffic. As would be appreciated, offline dictionaries differ from online dictionaries that are generated on the fly based on the data currently being compressed. Offline dictionary-based approaches are particularly suitable for IoT applications in that they provide high compaction ratios for communications involving small, repetitive, and (previously) uncompressed payloads. In addition, dictionary-based encoding and decoding processes are also comparatively fast operations, resulting in lower latency.

Example compression mechanisms that could be used may include, but are not limited to, compression mechanisms based on Lempel-Ziv compression (e.g., LZ77 or LZ78 compression schemes), Huffman coding-based approaches, or the like. Of course, while stateless, offline dictionary-based approaches are preferred, other compression schemes could also be used, in further embodiments, such as stateful compression, online dictionary-based compression, or the like.

According to various embodiments, various factors may be used to control when and how a particular stream of packets is compressed by mobile system 302 for sending. Thus, the techniques herein may also be performed dynamically, based these factors. In various embodiments, such factors may include, but are not limited to, any or all of the following:

- The transmission rate selected—In various embodiments, compression may only be applied to traffic having MCS s/transmission rates that fall below a defined threshold, $R_T$, in order to optimize bandwidth utilization without the penalty of adding unnecessary latency to high MCS transmissions. This is because, for a given packet size, the amount of airtime used is inversely proportional to the MCS/transmission rate at which it is transmitted.
- The size of the traffic—In further embodiments, compression may only be applied to packets exceeding a defined threshold, LT. As would be appreciated, the compression latency incurred for a packet has a fixed and variable component that depends on the size of the packet. It may very well be that compressing packets that are very small will not provide enough benefit to overcome this fixed cost and may even increase the overall latency, if exceedingly small.
- The type of traffic to be sent—Another factor that may be taken into account with respect to the compression is the nature of the traffic, such as whether the traffic is considered critical (e.g., control traffic) versus non-critical (e.g., audio data, video data, etc.). For instance, lower latency may be more important for critical traffic and, in such a case, may not be compressed.
- The specific application associated with the traffic—In further embodiments, the application associated with the traffic may also be a factor, when deciding whether to compress the traffic to be sent. Such information may be garnered, for instance, through explicit packet marking, packet inspection, or the like.
- Etc.

In other words, based on any or all of the factors above, mobile system 302 may vary its compression and/or sending strategies, in a dynamic manner. In some embodiments, mobile system 302 may even opt to send a particular stream of packets via multiple wireless paths in compressed and/or uncompressed form. In addition, the number of wireless paths selected to send the uncompressed stream and/or the compressed stream could also be varied, depending on any or all of the above factors.

In addition, note that while the above is described primarily with respect to mobile system 302 sending wireless traffic, the techniques herein are equally applicable to a stream of packets that may be sent to mobile system 302 over one or more wireless paths, as well. For instance, access point 308*c* (or a supervisory controller for access point 308*c*) may elect to use compress traffic to send to mobile system 302, based on the selected transmission rate, the size of the packets, etc.

Figure 8:
FIG. 8 illustrates an example rate lookup table with compression information.
Figure 8:
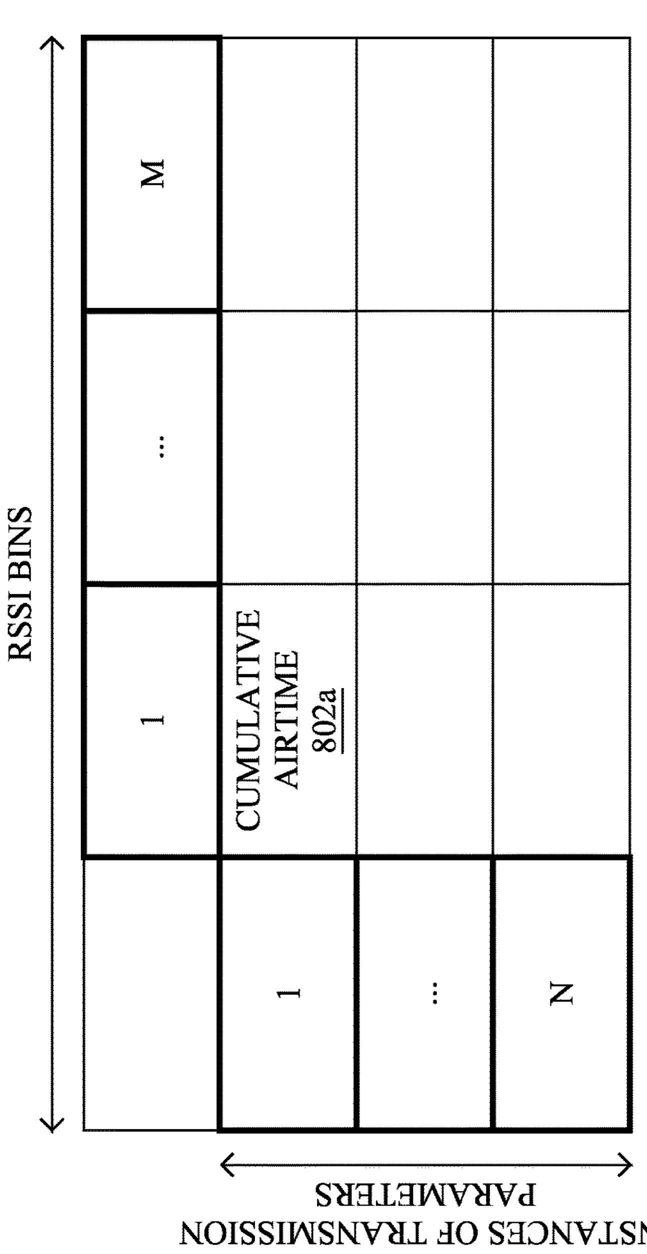

FIG. 8 illustrates an example rate lookup table 800 with compression information, according to various embodiments. Similar to rate lookup table 500 previously described with respect to FIGS. 5-6, rate lookup table 800 may comprise entries 802 that relate instances of transmission parameters to wireless performance metrics. More specifically, as shown, there may be any number of RSSI 'bins' that represent different ranges of RSSI metrics. Similarly, the transmission parameters may indicate the transmission rate by combining parameters such as the MCS index, spatial stream, guard interval, and/or channel bandwidth.

Here, a given entry 802*a* may, for its particular RSSI bin and transmission parameters, also define the channel occupancy time. In some embodiments, this may be the cumulative airtime taking into account the number of transmission attempts made before success or failure, packet size, compression ratio, QoS tag information, or the like. The cumulative airtime provides a better estimate of channel occupancy time, thereby resulting in more efficient and optimal selection of the next transmission rate to be used for a packet.

To populate rate lookup table 800 the sampling phase described previously, such as with respect to FIG. 4, may be modified to also record the packet size and/or the compaction ratio used for each rate in the retry chain. In other words, during the sampling phase, a packet may be transmitted by a sender (e.g., mobile system 302) and rate lookup table 800 updated using transmission feedback regarding the RSSI value, size of the packet sent, the compression ratio used, any QoS tags, etc. Once the sampling phase ends, the sender may then use rate lookup table 800 to quickly determine not only the transmission rate to use for a wireless communication to be sent, but also the compression to be applied (if any) to that communication, based on the actual or expected RSSI.

Figure 9:
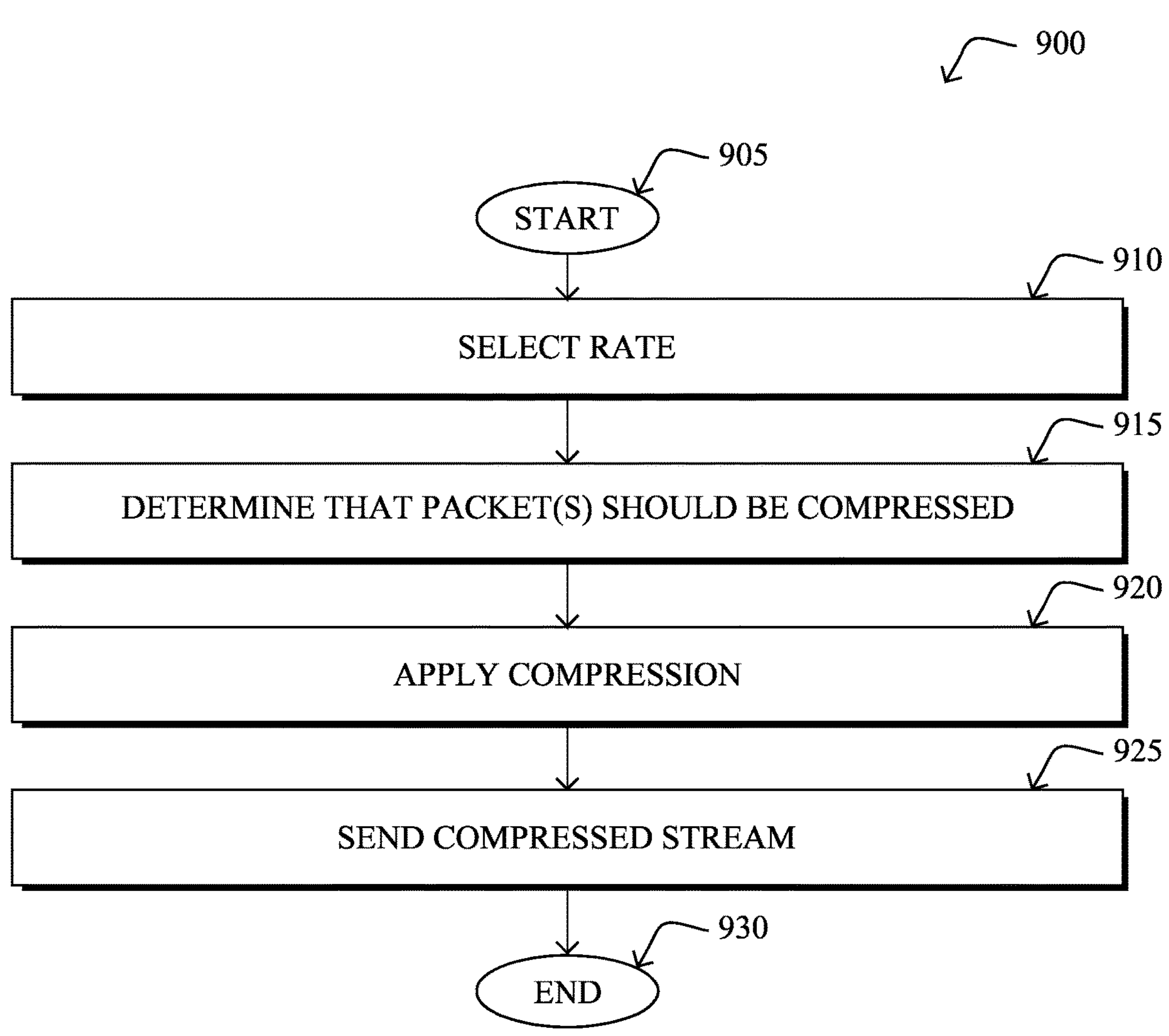
FIG. 9 illustrates an example simplified procedure for wireless transmission rate selection with stateless and offline dictionary compression.

FIG. 9 illustrates an example simplified procedure (e.g., a method) for wireless transmission rate selection with stateless and offline dictionary compression, in accordance with one or more embodiments described herein. The procedure 900 may start at step 905, and continues to step 910, where, as described in greater detail above, a device in a wireless network (e.g., a node comprising device 200) may select a transmission rate for one or more packets to be sent, based on a received signal strength indicator value. In one embodiment, the device may be onboard a moving vehicle. In another embodiment, the device may comprise an autonomous vehicle. In some embodiments, the device selects the transmission rate further in part on a quality of service tag associated with the one or more packets. In further embodiments, the device may select the transmission rate in part by performing, using the received signal strength indicator value, a lookup of one or more wireless transmission parameters from a rate lookup table. In one embodiment, the device may populate the rate lookup table during a sampling phase of operation. In some embodiments, the received signal strength indicator value is an expected value. For instance, the expected value may be based on a history of observed received signal strength indicators at a location of the device in the wireless network.

At step 915, as detailed above, the device may make a determination that the one or more packets should be compressed, based on the transmission rate selected by the device. In some embodiments, the device may do so by determining that the transmission rate is below a predefined threshold. In further embodiments, the device makes the determination that the one or more packets should be compressed, based further in part on the one or more packets being larger than a predefined size threshold.

At step 920, the device may apply, based on the determination, stateless offline dictionary compression to the one or more packets, to form a compressed stream of packets, as described in greater detail above. As would be appreciated, doing so will add some latency due to the additional processing required to encode (and decode) the one or more packets. However, doing so in cases in which the transmission rate is considered low and/or the packet(s) are considered large can help to reduce the overall airtime needed to convey the packet(s) via the wireless network.

At step 925, as detailed above, the device may send the compressed stream of packets via the wireless network and using the transmission rate selected by the device. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for wireless transmission rate selection with stateless and offline dictionary compression, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

selecting, by a device in a wireless network, a transmission rate for one or more packets to be sent, by using a received signal strength indicator value to perform a lookup in a rate lookup table populated during a sampling phase, the rate lookup table including an indication of compression to be applied based on the received signal strength indicator value;

making, by the device, a determination that the one or more packets should be compressed, based on the transmission rate selected by the device and a characteristic of the one or more packets;

applying, by the device and based on the determination, stateless offline dictionary compression to the one or more packets in accordance with the compression to be applied determined by the lookup, to form a compressed stream of the one or more packets, wherein the stateless offline dictionary compression uses a predetermined offline dictionary that is unchanged during compression of the one or more packets; and sending, by the device, the compressed stream via the wireless network and using the transmission rate selected by the device.

2. The method as in claim 1, wherein making the determination that the one or more packets should be compressed, based on the transmission rate selected by the device comprises:

determining that the transmission rate is below a predefined threshold.

3. The method as in claim 1, wherein the device selects the transmission rate further in part on a quality of service tag associated with the one or more packets.

4. The method as in claim 1, wherein the device is located onboard a moving vehicle.

5. The method as in claim 1, wherein the device makes the determination that the one or more packets should be compressed, based further in part on the one or more packets being larger than a predefined size threshold.

6. The method as in claim 1, wherein selecting the transmission rate for the one or more packets to be sent comprises:

performing, by the device and using the received signal strength indicator value, a lookup of one or more wireless transmission parameters from the rate lookup table.

7. The method as in claim 1, wherein sending comprises sending a stream of packets via multiple wireless paths in compressed and uncompressed forms.

8. The method as in claim 1, wherein the received signal strength indicator value is an expected value.

9. The method as in claim 8, wherein the expected value is based on a history of observed received signal strength indicators at a location of the device in the wireless network.

10. The method as in claim 6, wherein making the determination that the one or more packets should be compressed uses the transmission rate obtained from the lookup of the rate lookup table.

11. An apparatus, comprising:

one or more interfaces to communicate with a wireless network;

a processor coupled to the one or more interfaces that is configured to execute one or more processes; and a memory configured to store a process of the one or more processes that is executable by the processor, the process when executed configured to:

select a transmission rate for one or more packets to be sent, by using a received signal strength indicator value to perform a lookup in a rate lookup table populated during a sampling phase, the rate lookup table including an indication of compression to be applied based on the received signal strength indicator value;

make a determination that the one or more packets should be compressed, based on the transmission rate selected by the apparatus and a characteristic of the one or more packets;

apply, based on the determination, stateless offline dictionary compression to the one or more packets in accordance with the compression to be applied determined by the lookup, to form a compressed stream of the one or more packets, wherein the stateless offline dictionary compression uses a predetermined offline dictionary that is unchanged during compression of the one or more packets; and send the compressed stream of the one or more packets via the wireless network and using the transmission rate selected by the apparatus.

12. The apparatus as in claim 11, wherein the apparatus makes the determination that the one or more packets should be compressed, based on the transmission rate selected by the apparatus by:

determining that the transmission rate is below a predefined threshold.

13. The apparatus as in claim 11, wherein the apparatus selects the transmission rate further in part on a quality of service tag associated with the one or more packets.

14. The apparatus as in claim 11, wherein the apparatus is located onboard a moving vehicle.

15. The apparatus as in claim 11, wherein the apparatus makes the determination that the one or more packets should be compressed, based further in part on the one or more packets being larger than a predefined size threshold.

16. The apparatus as in claim 11, wherein the apparatus selects the transmission rate for the one or more packets to be sent by:

performing, using the received signal strength indicator value, a lookup of one or more wireless transmission parameters from the rate lookup table.

17. The apparatus as in claim 1, wherein the rate lookup table defines a channel occupancy time that takes into account a compression ratio used for packets transmitted during the sampling phase.

18. The apparatus as in claim 11, wherein the received signal strength indicator value is an expected value.

19. The apparatus as in claim 18, wherein the expected value is based on a history of observed received signal strength indicators at a location of the apparatus in the wireless network.

20. A tangible, non-transitory, computer-readable medium storing program instructions that cause a device in a wireless network to execute a process comprising:

selecting, by the device in the wireless network, a transmission rate for one or more packets to be sent, by using a received signal strength indicator value to perform a lookup in a rate lookup table populated during a sampling phase, the rate lookup table including an indication of compression to be applied based on the received signal strength indicator value;

making, by the device, a determination that the one or more packets should be compressed, based on the transmission rate selected by the device and a characteristic of the one or more packets;

applying, by the device and based on the determination, stateless offline dictionary compression to the one or more packets in accordance with the compression to be applied determined by the lookup, to form a compressed stream of the one or more packets, wherein the stateless offline dictionary compression uses a predetermined offline dictionary that is unchanged during compression of the one or more packets; and sending, by the device, the compressed stream of the one or more packets via the wireless network and using the transmission rate selected by the device.

* * * * *